Sept. 11, 1962 C. C. WAUGH 3,053,087
FLOWMETER
Filed Aug. 6, 1957 2 Sheets-Sheet 1
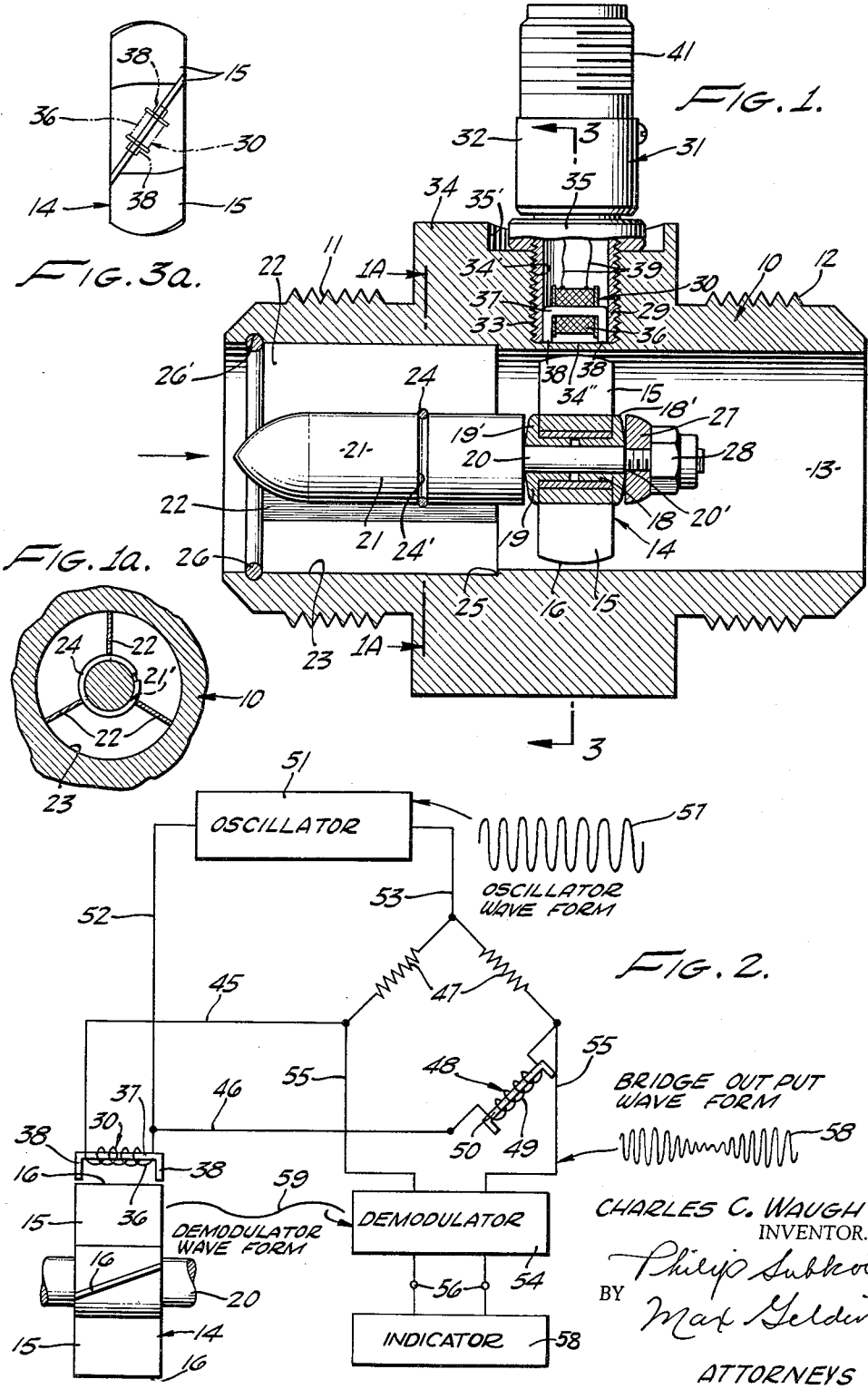
CHARLES C. WAUGH
INVENTOR.
BY Philip Subkow
Max Geldin
ATTORNEYS

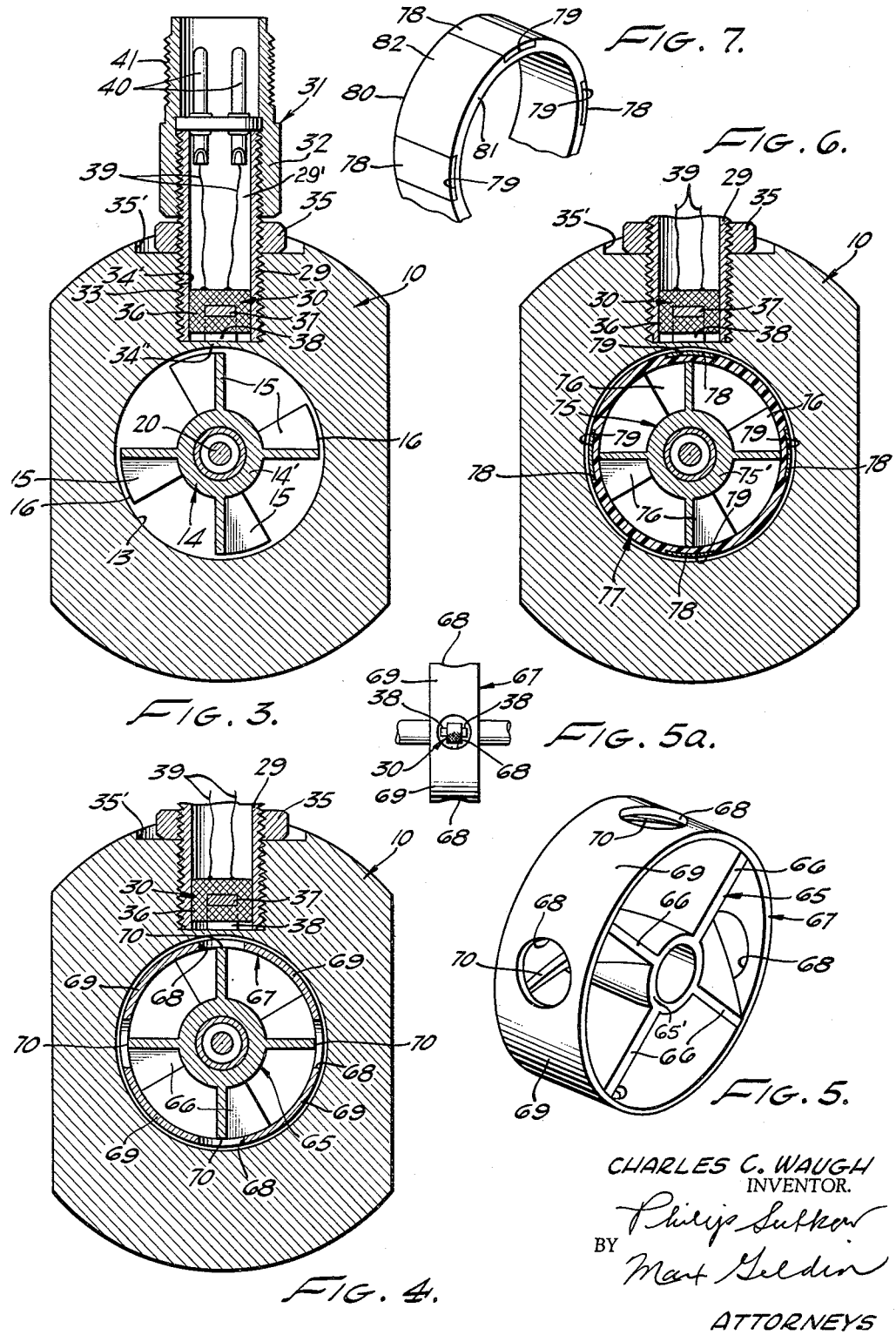

United States Patent Office 3,053,087
Patented Sept. 11, 1962

3,053,087
FLOWMETER
Charles C. Waugh, Tarzana, Calif., assignor to The Foxboro Company, a corporation of Massachusetts
Filed Aug. 6, 1957, Ser. No. 676,647
3 Claims. (Cl. 73—231)

This invention relates to a new and improved flowmeter for measuring fluid flow, either liquid or gaseous, employing the turbine principle. More particularly, the invention is directed to a flowmeter for dependably measuring rate or total quantity of flow of either liquids or gases supplied through conduits, e.g., in industrial and airborne applications. The invention device is particularly useful for airborne flow measurements such as flow of fluids to aircraft engines for operation thereof.

In electric current generating type flowmeters such, for example, as used in feed lines for delivering liquid or gaseous fuel to internal combustion or other engines, the flowmeter is necessarily of small size and dimensions because of the limited space available to install the same in the feed line. Therefore, the voltage and current output of the flowmeter generator is very low so that even the slightest electrical noise in the system will seriously affect the measuring function of the flowmeter, and at low flow rates these output values are so low as to render the obtaining of accurate flow measurements very difficult.

In one form of typical flowmeter of the aforementioned type, a ring-like magnet is mounted in the hub of the rotor or turbine wheel and an electrical coil is mounted in the wall of the conduit. When the turbine wheel is rotated, said coil generates an alternating current signal due to the reversal of magnetic flux as the rotor turns.

In such flowmeters, the generated signal serves to operate a device which measures the frequency of the signal, the frequency being directly proportional to flow rate. It is to be noted that in the existing turbine flowmeters the voltage output varies almost proportionately with flow rate, since the generated voltage is a function of the velocity of the rotor. Such devices normally include an amplifier which raises the level of the signal to a value sufficient to operate a counting circuit or similar electronic device. The amplifier must be of sufficient sensitivity to detect the very small signals which are generated at the lowest flow rates.

Further, turbine flowmeters operate over a ratio of as high as 20 to 1 between the maximum and minimum flow rates. Therefore, the frequency generated will also vary over the same ratio. Such a range of frequency requires a wide band amplifier in the frequency detection device. However, noise, which may be magnetically induced in the coil, electrostatically or magnetically induced in the connections between the coil and the amplifier, or which may originate within the amplifier, increases in a system with increase in the band width of the amplifier.

Moreover, in prior art flowmeters, e.g., of the type noted above, spurious signals may be induced by mechanical vibration. Thus, in present turbine type flowmeters, false signals may be induced when there is no fluid flowing through the meter and the meter is subjected to external mechanical vibration. This is because the rotor may oscillate slightly on its bearings due to vibration and therefore induce a signal in the generating coil. If the frequency of the vibration is relatively high, the induced voltage may be of considerable magnitude, even though the total amplitude of the rotor oscillation is small. This is because the induced voltage is a function of the velocity of the rotor.

Accordingly, one object of this invention is the provision of an improved flowmeter of the rotating turbine type, which produces an output voltage which is constant regardless of the flow rate.

Yet another object is to provide an improved flowmeter capable of accurately measuring and indicating flow rate and/or total flow of a fluid, e.g., gas, oil, gasoline, water, or any other fluid delivered through a conduit, without the use of highly sensitive electronic circuits.

Another object is to provide an efficient variable reluctance flowmeter of the turbine type, whose voltage output is a function of rotor position rather than of rotor velocity.

A still further object is the provision of a flowmeter of the aforementioned type which is less sensitive to spurious noise in the system.

Yet another object is to provide a flowmeter wherein small mechanical vibrations of the rotor will not induce spurious output signals.

A still further object is the provision of a flowmeter having a pickoff means which exerts substantially no external force on the rotor.

Another object is the provision of a flowmeter having an arrangement of parts permitting rapid assembly thereof, and which is relatively inexpensive yet which is durable and reliable in operation.

Other objects and advantages of the invention will appear hereinafter.

The above and other objects and advantages are accomplished according to the invention by a variable reluctance turbine type flowmeter or transducer having a rotor carrying a plurality of magnetically permeable members, e.g., composed of soft iron or other suitable material, spaced circumferentially about the rotor and a coil mounted adjacent the rotor and spaced from said permeable members, said coil preferably being wound on a magnetically permeable core having pole pieces facing said permeable members. Means are provided for electrically exciting the coil with an alternating current voltage. Also, means are afforded for producing an electrical signal or output as a function of rotor position, that is, an output is obtained from the system when each of said magnetically permeable members is positioned adjacent the coil.

In one embodiment, the blades of the rotor are composed of a magnetically permeable material and such blades constitute said magnetically permeable members. The coil is electrically excited by an A.C. voltage from an oscillator or other suitable source, and a modulated signal is produced when each blade tip passes the electrically excited coil mounted adjacent the rotor. The pole faces of the core, which, for example, may be C-shaped or E-shaped, face the blade tips, and as each blade tip passes the pole faces of the core, the reluctance of the magnetic path therebetween will be reduced and the coil impedance increased.

According to one embodiment the coil can be made a part of a bridge circuit which is balanced except when a blade tip approaches the coil, at which time the bridge becomes unbalanced and a modulated output voltage is produced. The bridge output voltage is demodulated into a voltage which is proportional to the reduction of reluctance noted above. The bridge circuitry and the demodulator are standard and well known.

In a modification of my device, the pickoff coil employed is the same as noted above, but the rotor blades are of non-magnetic material and a ring is positioned about the ends of the blades. Said ring is composed of magnetically permeable material and contains holes at spaced intervals about the ring. When the solid arcuate portions of the ring between the holes respectively move to a position adjacent the coil, the reluctance of the magnetic path is reduced and an output signal is generated.

In still another modification the above noted rotor blades and ring may be composed of non-magnetic material, and strips of magnetically permeable material are carried at spaced intervals on the outer periphery of the ring. When these strips are moved adjacent the coil by rotation of the rotor, the reluctance is also reduced and an output signal produced.

In my variable reluctance flowmeter, the voltage output is not a function of the rotor velocity, but a function of the rotor position. Therefore, equal amplitude voltages are generated, regardless of the rotor velocity. This means that the amplitude of the output signal is constant regardless of the flow rate and therefore the amplifier of the frequency detecting device need not be ultra sensitive in order to detect the low level signals that are generated in the prior art devices at low flow rates.

Further, the signal output from the bridge circuit, usually employed in the device is of a relatively narrow band width corresponding to the carrier frequency. With suitable tuning of the signal in the demodulator, also usually employed, spurious signals or electrical noise is eliminated. Therefore, my device is far less susceptible to spurious noise and is more reliable in operation than prior art flowmeters.

Also, as regards spurious signals induced by mechanical vibration in prior art devices, in my variable reluctance type flowmeter wherein the output is a function of the rotor position, high frequency, low amplitude oscillations of the rotor will scarcely induce any signal at all. High amplitude excursions of the rotor would induce a signal in my variable reluctance flowmeter, but such excursion is not likely to occur due to vibration.

Moreover, a further advantage of my variable reluctance device is that no external force is exerted on the rotor by the signal pickoff.

The invention will be clearly understood from the description below of certain preferred embodiments of my improved flowmeter, taken in connection with the accompanying drawings wherein:

FIG. 1 is a cross section of my flowmeter, shown partly in full for clarity;

FIG. 1a is a section taken on line 1a—1a of FIG. 1;

FIG. 2 is a schematic illustration of a circuit employed in conjunction with my flowmeter;

FIG. 3 is a vertical section taken on line 3—3 of FIG. 1;

FIG. 3a shows a detail of the device of FIGS. 1 and 3;

FIG. 4 is a section similar to FIG. 3, showing a modification of my device;

FIG. 5 is a perspective view of the rotor of FIG. 4;

FIG. 5a shows a plan view of a detail of the modification of FIGS. 4 and 5;

FIG. 6 is a section similar to FIGS. 3 and 4, showing still another modification of my flowmeter device; and FIG. 7 is a fragmentary perspective view of the rotor of FIG. 6.

Referring to FIGS. 1 and 3 of the drawings, the flowmeter comprises a hollow case 10 which can be coupled at opposite ends to piping by means of the external threads 11 and 12. The case is constructed of a non-magnetic material such as aluminum, certain stainless steels, or plastic. Mounted substantially in the center of bore 13 of the case 10 is a rotor 14 comprising a hub 14' about the periphery of which are disposed a series of turbine blades 15, shown as four in number in FIG. 3. The hub and blades are composed of a magnetically permeable material such as soft iron or a magnetically permeable stainless steel. The blades 15 are of a helical shape so that a rotary force is imparted to the rotor 14 on passage of fluid through bore 13, due to reaction of the blades to the moving fluid. The axis of the rotor is on the longitudinal axis of the case, and sufficient clearance is provided between the outer edges 16 of the blades 15 and the wall of bore 13 to permit freedom of rotation of the rotor.

The rotor 14 is supported for rotation on a downstream sleeve bearing 18 and on an upstream sleeve bearing 19 mounted on an axially disposed shaft or support 20 connected to one end of a bullet 21. The shaft or bearing support 20 and bullet 21 are positioned and held concentric within the bore 13 of the case by means of radial vanes 22 which are held in fixed longitudinal relation with respect to the bullet 21 by means of a retaining ring 24 positioned in a circular groove 24' in the periphery of the bullet intermediate the ends thereof. The inner edges of vanes 22 are received in longitudinal slots 21' which are equally spaced about the periphery of bullet 21, and the outer edges of the vanes 22 engage the wall portion 23 of the bore of case 10. It will be understood that instead of maintaining the vanes 22 in fixed longitudinal relation with bullet 21 by means of the snap ring 24, said snap ring may be omitted and the vanes made integral with the bullet 21. The vanes 22 also serve to straighten the flow of fluid through the case. Bullet 21 and vanes 22 are prevented from moving longitudinally within the bore 13 by abutment of the downstream ends of the vanes 22 with a shoulder 25 formed on the wall of bore 13, and by engagement of the upstream ends of the vanes with a removable snap ring 26 positioned in a circumferential groove 26' of the bore. The sleeve bearings 18 and 19 each carry a flange 18' and 19' at the outer end of said bearings and said flanges are held against substantial axial motion by means of a thrust plate 27 mounted on shaft 20 and forced against a shoulder 20' on said shaft, by means of a lock nut 28. Bearings 18 and 19 rotate with rotor 14 on the shaft 20 against thrust plate 27.

Mounted externally of the fluid passage 13 and opposite blades 15 of the rotor 14 is a coil assembly 30. Said coil assembly is positioned in the lower end of a sleeve 29 which has external threads 33 for mating engagement with threads in a bore 34' of an enlarged body portion 34 of the case 10, said bore 34' being formed radially of conduit 13 and terminating short of the conduit 13, leaving a thin wall of non-conductive metal 34'' of case 10 between the inner end of bore 34' and conduit 13. A plug 31 is internally threaded at its lower end 32 for engagement with the threads 33 on sleeve 29 as best seen in FIG. 3. The plug 31 is adapted to be turned down adjacent a nut 35 which is also threadably received by the external threads of sleeve 29 and is seated in a recess 35' formed in the body portion 34 of the case 10. It will be noted that by manipulating nut 35 the vertical position of the sleeve 29 and the coil assembly 30 can be varied as seen in FIGS. 1 and 3, to change the distance between the coil assembly and the blades 15 of the rotor 14.

The coil assembly 30 is composed of a magnetically permeable C core 37 having depending pole faces 38 at the ends of the core, and a coil 36 wound about the core 37. The ends 39 of the coil are connected to terminals 40 mounted on the outer end of the sleeve 29. The core 37 and coil 36 are maintained in position in sleeve 29 by filling the interior 29' of sleeve 29 with a resin employing well known potting techniques to secure members 36, 37 and 39 in fixed position in said sleeve. The lower end 32 of plug 31 is adapted to be screwed onto the upper external threads of the sleeve 29, as pointed out above, the plug having external threads 41 at its upper end for engagement with a socket (not shown) of an electrical circuit as described below.

It is noted that the C core 37 is positioned so that its axis is not parallel to the axis of the rotor, but is at an angle thereto such that the C core is substantially in alignment with the end or tip 15 of each of the blades when such blades are rotated to a position directly opposite the core, as best seen in FIG. 3a. That is, the pole faces 38 at the end of core 37 face upon the blade tip 16 when the blade is rotated to the aforementioned position. The reason for such positioning of the core with respect to the blade tips will be noted hereinafter.

Referring to FIG. 2 of the drawings, it will be noted that the coil assembly 30 is made an active arm of a bridge circuit comprising resistors 47 and an inactive arm 48, the latter being in the form of a coil 49 wound on a core 50. The terminals 40 are connected to a resistor 47 and to the inactive arm 48 through leads 45 and 46. Across one end of the inactive arm 48 and the junction between resistors 47 is connected an oscillator 51 via leads 46, 52 and 53. Across the other end of the inactive arm 48 and the junction between one of the resistors 47 and lead 45 is connected a demodulator 54 via leads 55. The output 56 of the demodulator 54 can be connected to a conventional frequency to voltage converter, the output voltage of which is thus proportional to frequency and to the rate of flow, and functioning as a flow rate indicator designated generally by numeral 58.

In operation of the device described above, the core 37 of the coil assembly 30 is electrically excited by means of an alternating current voltage from the oscillator, having a wave form indicated schematically at 57. As each of the blades 15 of the rotor 14 rotates to a position directly opposite the core 37 as seen in FIGS. 3 and 3a, the reluctance of the magnetic path between the pole faces 38 of the core and the adjacent blade 15 of the rotor is reduced and the impedance of coil 36 is increased. The output of the bridge circuit, of which coil assembly 30 is a part, is designed so that the bridge remains balanced until a blade tip 16 approaches the coil assembly 30. When the blade tip is disposed directly opposite the coil assembly and the reluctance is reduced, as previously mentioned, the bridge becomes unbalanced and a modulated output voltage is produced having a wave form schematically indicated at 58. The bridge output voltage is demodulated by the demodulator 54 into a voltage having a wave form schematically indicated at 59, which voltage is proportional to the degree of reduction of the reluctance as result of the positioning of the blade tip directly opposite and in alignment with the core 37 of the coil assembly 30.

By aligning the core 37 of the coil assembly 30 with the blade tip 16 of the blades 15 when the latter are respectively rotated to a position directly opposite the coil assembly, so that the pole faces 38 of the core face the blade edge 16, a maximum change in reluctance is thus produced resulting in a maximum output voltage from the bridge. While it is not necessary that the core be in substantial alignment with the blade tips 16, as described above, where the axis of the coil 30 is shifted from the aforementioned preferred position, say to a position parallel to the axis of the rotor 14 and hence at an angle to the blade tips 16, the change in reluctance on positioning of the blades opposite the coil assembly 30 will not be as great as in the preferred position noted above, and hence the output voltage from the bridge will also be smaller than in the preferred position of the core 37 previously described.

It will be understood that while I have shown a rotor having four blades thereon, the number and spacing of the magnetically permeable blades 15 can be varied to change the frequency of the output signal.

In FIGS. 4, 5 and 5a is a modification of the device described above. In such modification the rotor 65 is similar in structure to rotor 14 except that hub 65' and the blades 66 thereof are composed of a non-magnetic material. A shroud ring 67 is connected to the outer ends of the blades 66 and encircles the rotor. The shroud ring 67 is composed of a magnetically permeable material and has a series of holes 68, here shown as four in number, formed therein, said holes being equally spaced about the ring. The ends or tips 70 of the blades 66 are positioned across the holes 68, as best seen in FIG. 5, although the ends of the blades may be connected to the solid portions 69 of the ring, if desired. As shown in FIG. 5a, preferably the distance between the two pole pieces 38 is less than the diameter of the holes 68 so as to produce a substantial change in reluctance when the rotor moves from a position where an arcuate portion 69 of the ring is disposed opposite the pole pieces to a position where an adjacent hole 68 is disposed opposite the pole pieces, and vice versa. Also, in preferred practice, the coil assembly and core in the instant modification is positioned on an axis parallel to the axis of the rotor.

In operation of the modification of FIGS. 4 and 5, when the rotor 65 is rotated to a position where the arcuate portions 69 of the ring 67 are disposed opposite the core of the coil assembly 30, the reluctance in the magnetic path between the ring 67 and the coil assembly decreases to unbalance the bridge and produce an output from the bridge circuit. When the holes 68 are disposed opposite the coil assembly 37 the reluctance is increased and under these conditions the bridge circuit is substantially balanced and a minimum or essentially no output is obtained from the bridge. It will be understood that the number of holes 68 positioned about the ring 67 may be varied to afford a larger or smaller number of arcuate magnetically permeable ring portions 69 between said holes, to thereby increase or decrease the number of output signals per revolution of the rotor 65. Also of course the size of holes 68 may be increased or decreased as desired, thus varying the arcuate length of ring portions 69, to obtain the desired amplitude of output signal.

In FIGS. 6 and 7 is shown still another modification of my device wherein the hub 75' of rotor 75 and blades 76 thereof are formed of non-magnetic material and a shroud ring 77 is connected to the ends of blades 76. The shroud ring 77 is also composed of a non-magnetic material and a series of thin strips 78 composed of a magnetically permeable material are disposed in recesses 79 formed in the outer surfaces of the shroud ring 77. There are four such strips shown in the embodiment of FIGS. 6 and 7 and these strips are equally spaced about the periphery of the ring. The strips 78 extend from one edge 80 of the shroud ring to the opposite edge 81 thereof and said strips may be connected to the ring in any suitable manner, e.g., by electroplating or soldering of these thin strips to the ring 77. Preferably the coil assembly and core in the instant modification are positioned on an axis parallel to the axis of the rotor.

When the rotor 75 is rotated to a position where a strip 78 is disposed opposite the coil assembly 30, as shown in FIG. 6, the reluctance in the magnetic path between the shroud ring and the coil assembly decreases to unbalance the bridge and produce an output from the bridge circuit, and when the rotor 75 is moved to a position wherein an arcuate portion 82 of the rotor between the strips 78 is located opposite the coil assembly, the bridge circuit is essentially balanced and substantially no output is obtained. It will be understood that the number of strips 78 employed may be increased or decreased and the arcuate length of said strips may also be varied, to vary the frequency of the output signals from the bridge.

If desired, the bridge need not be initially balanced, e.g., when the rotor 14 in FIG. 3 is positioned so that the coil assembly 37 is between a pair of blades 15, but rather the bridge may be designed so as to produce an output under these conditions. When the rotor 14 is positioned so that a blade 15 thereof is disposed directly opposite the coil assembly the output thus produced as result of decreased reluctance will be different from the initial bridge output and can be measured in known manner.

From the foregoing it is seen that I have developed a novel variable reluctance type flowmeter wherein the voltage output is a function of the rotor position rather than of the rotor velocity as in prior art devices, thus producing an output signal whose amplitude is constant regardless of flow rate, which is particularly advantageous for low flow rates. Further, in my device a narrow frequency band may be employed, which thus lowers the sensitivity of my flowmeter to spurious noise in the system. Also, as result of the output being a function of rotor position, high frequency, low amplitude oscillations due to mechanical vibration of the rotor will produce substantially no signal. Finally, rotor movement is not induced by the pickoff coil in my device, since no external force is exerted on the rotor by said pickoff.

While I have described particular embodiments of my invention for the purpose of illustration, it should be understood that various modifications and adaptations thereof may be made within the spirit of the invention as set forth in the appended claims.

I claim:

1. A flow transducer comprising a case, a fluid passage in said case, a fluid actuated rotor having a plurality of magnetically permeable radially extending blades positioned in said passage, said blades being spaced circumferentially about the hub of said rotor for rotation therewith, a coil mounted externally of said passage and having a magnetically permeable core, said core having pole faces positioned opposite said blades carried by said rotor, the reluctance between said pole faces of said core and each of said blades being reduced as the respective blades rotate to a position opposite said core, and being increased as the blades rotate away from said position, to cause a cyclical variation in the inductance of said coil during rotation of said rotor, a four terminal bridge circuit, said coil connected between two adjacent terminals of said bridge, an oscillator connected to two opposite input terminals of said bridge and causing an alternating electrical current to flow in said circuit, said current producing an alternating potential between two opposite output terminals of said bridge, said potential varying in amplitude in accordance with changes in the inductance of said coil, and a demodulator circuit connected to said output terminals of said bridge to produce an output potential representative of the flow rate.

2. A transducer which comprises a case, a conduit in said case forming a fluid passage, a fluid actuated rotor positioned in said passage, said rotor comprising a hub and a plurality of magnetically permeable blades carried on the periphery of said hub for rotation therewith, said blades being spaced circumferentially about said hub, an electromagnetic coil mounted in said case exteriorly of said passage adjacent said conduit and opposite said rotor, said coil being spaced from said blades, the reluctance between said coil and each of said blades being reduced when the respective blades rotate to a position opposite said coil, and being increased as the blades rotate away from said position opposite said coil, alternating current generating means for electrically exciting said coil with an alternating current voltage, means for modulating said exciting current in response to movement of said blades opposite said coil and to variation in impedance of said coil, said last-mentioned means including a bridge circuit, said coil being connected in said bridge circuit and forming an active arm thereof, said generating means for exciting said coil being connected across diagonally opposite terminals of said bridge circuit, a demodulator connected across the other diagonally opposite terminals of said bridge circuit, and means responsive to the frequency of the signal from said demodulator to indicate rate of fluid flow.

3. A transducer which comprises a case, a conduit in said case forming a fluid passage, a fluid actuated rotor positioned in said passage, said rotor comprising a hub and a plurality of magnetically permeable blades carried on the periphery of said hub for rotation therewith, said blades being spaced circumferentially about said hub, an electromagnetic coil mounted in said case exteriorly of said passage adjacent said conduit and opposite said rotor, said coil being spaced from said blades, the reluctance between said coil and each of said blades being reduced as the respective blades rotate to a position opposite said coil, and being increased as the blades rotate away from said position opposite said coil, a four-arm bridge circuit, said coil being connected in said bridge and forming an active arm thereof, and a second coil connected in said bridge circuit and forming an inactive arm thereof adjacent said active arm, to maintain the bridge balanced when the impedance of said first-mentioned coil is not varied by said rotor, third and fourth inactive arms in said bridge, an oscillator connected across a pair of opposite terminals of said bridge for electrically exciting said first-mentioned coil with an alternating current voltage, a demodulator connected across the other opposite terminals of said bridge, and means responsive to the frequency of the signal from said demodulator to indicate rate of fluid flow.

References Cited in the file of this patent

UNITED STATES PATENTS

| | | |
|---|---|---|
| 2,325,927 | Wilbur | Aug. 3, 1943 |
| 2,406,723 | Von Hortenau | Aug. 27, 1946 |
| 2,683,224 | Cole | July 6, 1954 |
| 2,707,393 | Hardway | May 3, 1955 |
| 2,709,366 | Potter | May 31, 1955 |
| 2,728,893 | Bartelink | Dec. 27, 1955 |
| 2,812,661 | Cox | Nov. 12, 1957 |
| 2,822,688 | Wiley | Feb. 11, 1958 |
| 2,949,772 | Kritz | Aug. 23, 1960 |
| 2,974,525 | Cole | Mar. 14, 1961 |
| 2,983,141 | Vanator | May 9, 1961 |
| 3,000,210 | Faure-Herman | Sept. 19, 1961 |

FOREIGN PATENTS

| | | |
|---|---|---|
| 746,190 | Great Britain | Mar. 14, 1956 |